P. L. SMITH.
SAFETY MOTOR CRANK.
APPLICATION FILED OCT. 13, 1919.
1,438,465.
Patented Dec. 12, 1922.
2 SHEETS—SHEET 2.
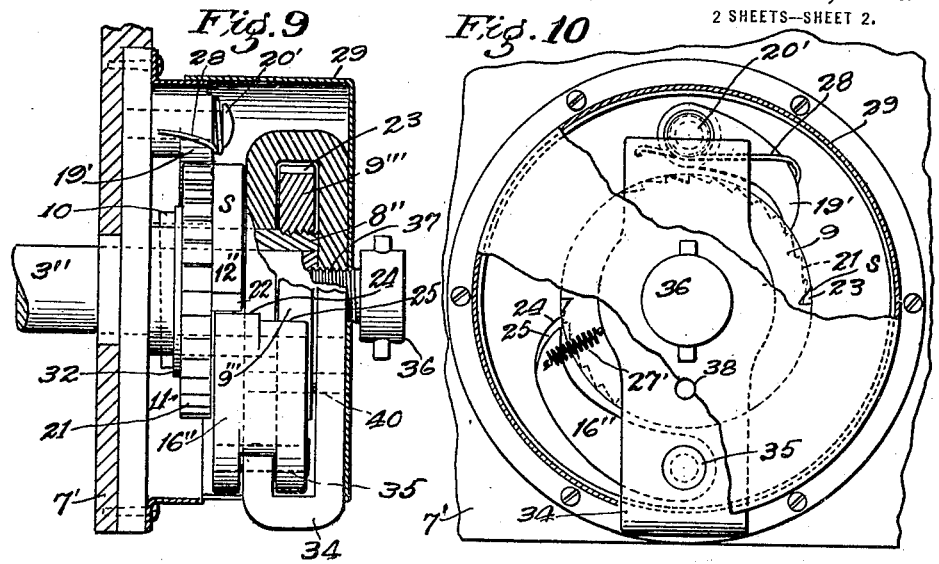
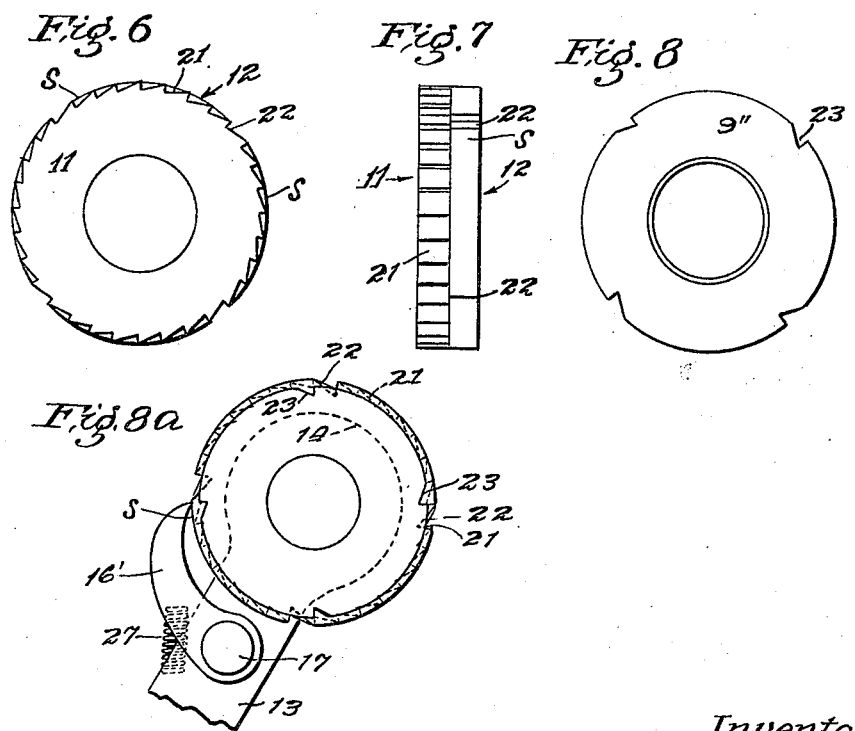
Witness
C. C. Holly
Inventor
Patrick Louie Smith Patented Dec. 12, 1922.

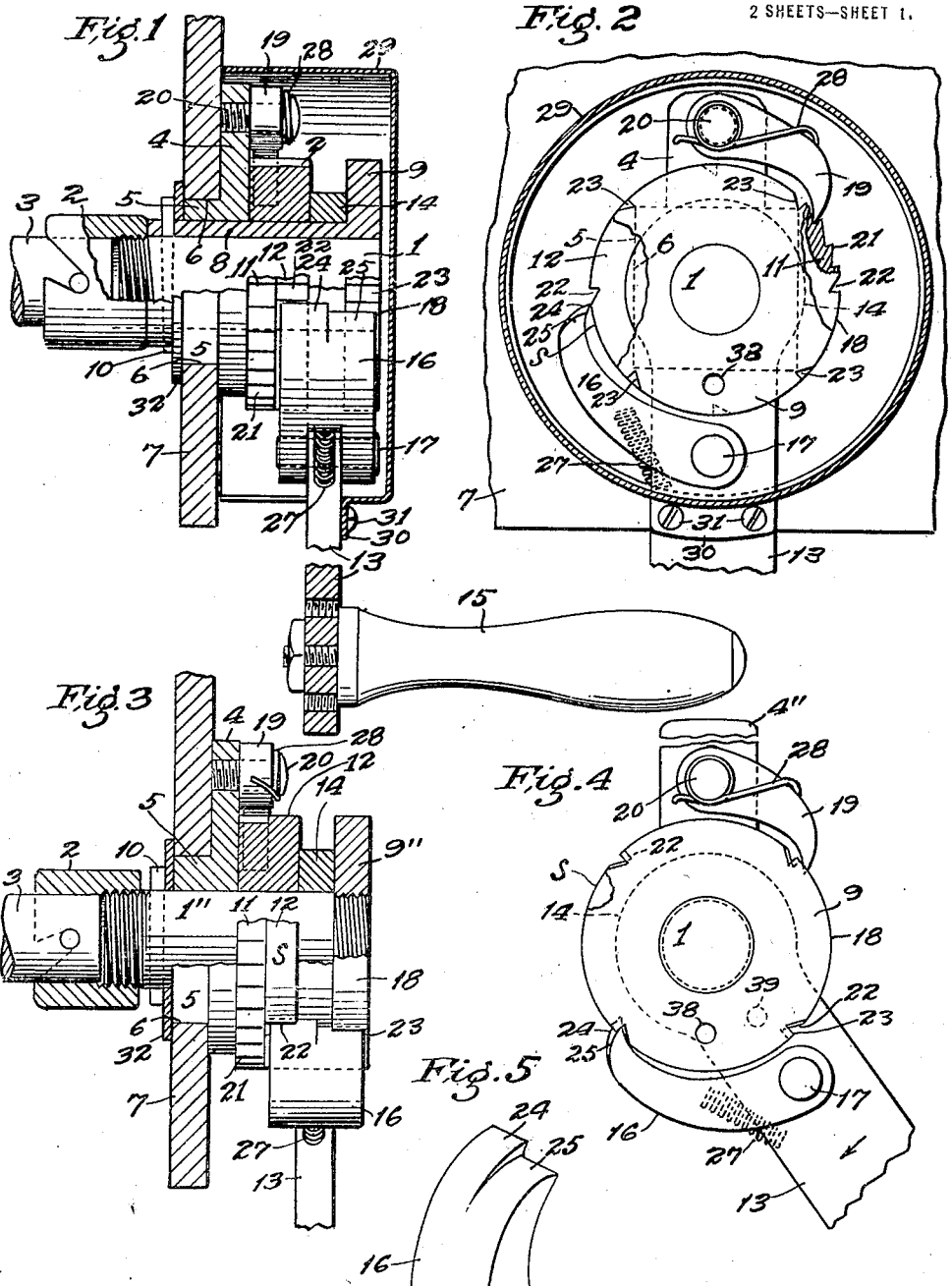

1,438,465

UNITED STATES PATENT OFFICE.

PATRICK LOUIE SMITH, OF GREENWOOD, ARKANSAS.

SAFETY MOTOR CRANK.

Application filed October 13, 1919. Serial No. 330,365.

*To all whom it may concern:*

Be it known that I, PATRICK LOUIE SMITH, a citizen of the United States, residing at Greenwood, in the county of Sebastian and State of Arkansas, have invented a new and useful Safety Motor Crank, of which the following is a specification.

This invention relates to devices for starting motors or engines and is particularly applicable to motors of the type used in self-propelled vehicles.

With ordinary cranking devices for starting motors the person manually operating the crank must be constantly watchful against accidents that are likely to occur as a result of back firing or back kick. The manual cranking of the engine is dangerous and consequently is often done in a cautious and inefficient manner so that the starting of the motor is only effected after many trials.

To avoid this danger, safety appliances have been proposed wherein reverse rotation of the engine shifts the crank longitudinally of the shaft for the purpose of disengagement, and in some instances the crank is locked against reverse movement. Heretofore a shifting of the crank longitudinally of the engine shaft has been required to bring the crank into and out of operative relation to the rest of the elements, and an object is to avoid this.

An object of this invention is to render manual starting of the motor absolutely safe to the operator so that he may confidently take hold of the crank when the engine is ready for starting and by efficient cranking of the motor be able to start it at once without so shifting the crank as to incommode the operator, and to leave the crank and its connections ready at all times for instant cranking action.

The mechanism is applicable for use with so-called self-starter mechanisms and a further object is to secure perfect co-operation between the parts whether the device is manually operated or otherwise, so as to overcome the effects of back firing or back kick of the motor and thus prolong the life of the cranking mechanism.

Other objects are simplicity and strength of construction.

Another object is to provide a safety crank attachment that may be readily attached to an automobile of a common type not now provided with any safety cranking arrangement.

An object is to make provision for cranking from the chauffeur's seat in an automobile.

The invention consists in that the crank is connected to the engine shaft through the medium of a pawl that tends to drive the engine shaft forward when in cranking position and that is moved and held out of operative position by reverse action of the engine shaft or crank. This basic feature of the invention is capable of embodiment in various forms; and various constructions and arrangements of parts may be employed without departing from the invention.

Broadly considered the invention comprises the combination with an engine shaft, of means to revolve the shaft in one direction to start the engine; and means operable by a reverse movement of the shaft, to make the shaft revolving means inactive so that the engine shaft may freely spin backward.

Further objects, advantages and features of invention may appear from the accompanying drawings, the subjoined detail description and the appended claims.

The accompanying drawings illustrate the invention in some of the forms in which I at present contemplate embodying the same.

Fig. 1 is a fragmental elevation partly in axial section, of a safety cranking attachment made in accordance with this invention. The crank is broken to contract the view, and the stationary click holder is shown fixed to a fragment of the frame that supports the engine not shown.

Fig. 2 is a front elevation of the appliance shown in Fig. 1, the outer end of the housing and parts of the cranking or ratchet wheel and pawl retracting cam are broken away to expose parts that would otherwise be hidden. The broad pawl is retracted.

Fig. 3 is a view analogous to Fig. 1, dispensing with the sleeve-like head and showing the parts in position during cranking action.

Fig. 4 is a fragmental elevation of a form viewed as though looking toward the right side of Fig. 3 during back action of the engine, which is not shown. The crank arm is broken away in part and the holder extension is broken to indicate indefinite extension thereof as a handle.

Fig. 5 is a perspective view of one form of the broad pawl detached.

Fig. 6 is a rear face view of the combined ratchet and pawl retractor.

Fig. 7 is an edge view of the pawl retractor.

Fig. 8 is a side elevation of the cranking ratchet wheel detached.

Fig. 8ª is an elevation of a pawl retractor with straight tip broad pawl.

Fig. 9 is a broken elevation of another form of cranking mechanism adapted for operation by a detachable crank, not shown.

Fig. 10 is a broken front elevation of the device shown in Fig. 9.

Referring first to the form shown in Figs. 1 and 2, the cranking shaft 1 is adapted to be connected by any suitable means as the coupling 2, with the motor shaft 3, to crank the same. Said cranking shaft is journaled in a mounting or attaching piece which is shown as a pawl holder 4 and said attaching piece may be fitted with suitable fastening means, as one or more pins, prongs, hooks, notches, shoulders, bosses or extensions as may be desired or necessary for securing the pawl holder 4 to the engine support, which may be the running gear, the chassis, or the spring saddle of the automobile or other machine to be driven by the motor, not shown. In Figs. 1 and 2 the fastening means comprise an angular boss or extension 5, of the pawl holder 4 and said extension 5 is seated in a seat 6, in the frame bar 7 to prevent rotation of said pawl holder relative to the frame bars. Said fastening means as shown also comprises a cylindrical sleeve 8, having a head 9, at one end; and having its other end extended through the frame bar 7 and being there fixed to the cranking shaft by pin 10, which also secures the sleeve and cranking shaft against withdrawal from said bar. The pawl retracting ratchet and cam 11, 12, and crank 13 are journaled on said sleeve and consequently on said shaft 1, and are in journaled relation to the frame bar 7.

The cranking shaft 1, may thus be carried in a bearing formed for the sleeve 8, and is thus journaled to be oscillated or revolved relative to the frame bar 7 to crank the motor, not shown, which is in fixed relation to said bar.

A pawl carrier or crank 13 has an eye 14 and is thereby journaled on the cranking shaft 1 through the medium of the sleeve 8 and has a handle 15, by which it may be turned.

Said crank is provided with releasable means for rotating the shaft, which means comprise a broad pawl, 16, carried by the crank; and being for that purpose pivoted at 17, to the crank arm 13, and adapted to engage the cranking ratchet wheel which is fixed to the cranking shaft to turn the same and is formed by the notched periphery 18, of the head 9, of the sleeve 8.

The pawl lifting device or retractor is arranged to lift the pawl when the shaft turns back relative to the crank and has a ratchet wheel portion 11, and an internotch wheel pawl retracting cam portion 12. A spring-pressed click 19, is pivoted by pin 20, to the attaching piece or pawl holder 4, and engages the teeth 21, of the ratchet portion 11, of the pawl retractor wheel to prevent said wheel from rotating backward. Any desirable well known means for allowing rotation in one direction only may be employed in place of the click and ratchet wheel.

The cranking ratchet wheel 9, 18, is fixed upon the cranking shaft and is provided with notches 23 adapted to be engaged by the cranking pawl 16, which operates the cranking ratchet wheel 9, 18 to turn the crank shaft.

The cranking pawl 16, is adapted to enter notches 22, in the pawl retracting cam portion of the pawl retractor, and this allows the pawl 16, to engage in notches 23 of the cranking ratchet, when two of the notches 22, 23 are alined. The tip of the pawl 16 may be said to have two limbs, the pawl lifting limb 24 being accommodated in the notches 22 during cranking and being lifted by the internotch arcs s on kick back of the engine, according as power is applied by or to the cranking shaft to or from the engine.

The cranking ratchet wheel 18 is thus adapted to be rotated by the pawl 16 in the operation of cranking. The click 19 allows the rotary member formed by the ratchet and cam 11, 12 to turn with the pawl 16 and the crank, when the crank is operated to start the engine, and prevents said rotary member from turning in the reverse direction upon kick back of the engine 16. When the crank is turned to start the engine, the cranking pawl 16 engages the notches 23 of the cranking ratchet wheel and the notches of the pawl-controlling cam section of the pawl retractor, to turn said pawl retractor at the same time that the cranking ratchet wheel is turned by the pawl. The cranking ratchet wheel 9, 18, thus turns the shaft 1.

In case of kick back of the engine, the shaft 1 turns the head 9, which drives the pawl 16 back, and the tip 24 rides on the cam 12, which is held stationary by click 19, and releases arcs of the pawl from head 9 which is thus left free to spin.

As is well known in practice to start the engine the crank is pulled upward from its normal position, which is, hanging downwardly in a vertical position from the shaft. The crank is usually in an upward position at the end of a stroke when the engine starts and when the attendant releases the crank it will return to its normal vertical position due to gravity, and this returning movement will lift the pawl 16 and hold the same away from the now rapidly revolving ratchet wheel 9, 18, through the medium of the notches 22 and the cam 12. It therefore can be said that the cranking pawl 16 is held away from and out of engagement with the ratchet wheel when the shaft obtains an increased forward movement and all wear and noise which would result if the pawl 16 rode over the top of the notches 23, is thus eliminated.

In Figs. 1, 2, 3, 4 and 5 the pawl is shown with two limbs 24, 25, one of which is longer than the other so that when the tip of the longer limb rests upon the internotch cam 12 of the retractor, the tip of the shorter limb of the pawl will be lifted so as to clear the cranking ratchet wheel, thus to free the cranking ratchet wheel from operation by the crank.

The pawl 16 is held in place by spring 27 seated in the pawl and the crank arm. The click 19 is held in position by the spring 28 carried by the pin 20 and the extension 4.

In practical operation, to crank the motor, the operator will grasp the handle 15 and crank in the usual manner. The pawl 16 engages the cranking ratchet and also the pawl-retractor and revolves them in the same direction with the crank. The cranking ratchet wheel acting through the sleeve 8 and fastening pin 10 rotates coupling 2 and the motor shaft. In case of back firing, the cranking ratchet 9, 18, will be thrown back slightly and the click 19 prevents the pawl-retractor from being turned back, so that the cam 12 is stationary and the pawl 16 rides on the cam, thus lifting the pawl from the cranking ratchet wheel. The cranking shaft is thus freed from the crank and may rotate without turning the crank.

In Fig. 3 the cranking shaft 1″ is connected directly to the cranking ratchet wheel 9″, thus dispensing with the sleeve 8 shown in Fig. 1. The connection between the cranking shaft and the cranking ratchet wheel may be made in various ways, and in Fig. 3 said ratchet wheel is shown as being secured by screwing the same onto the end of the cranking shaft.

In Fig. 4 the extension 4″ is indicated as being of greater length so as to form a handle by which the operator can hold the pin 20 and consequently the click 19 with one hand while turning the crank with the other hand. With such construction the operator would use the crank with the safety appliance in practically the same manner as the old style crank.

In Figs. 1 and 2 a housing 29 is shown, to give a finished appearance and to protect the device from dust. Said housing is fastened to the crank arm 13 by a lip 30 bent up from the housing and fixed to the crank arm by screws 31.

In Figs. 1 and 3 a washer 32 is provided between the fastening pin 10 and the frame 7, to make a tight fit.

The click holder 4 is shown in Figs. 1 and 2 as being constructed with an angular boss 5 in an angular seat 6, thus to prevent the holder from rotating relative to the frame 7.

In Fig. 9 there is shown an attachment for the engine shaft 3″ so arranged that the crank is detachable in the same manner as heretofore. With this object in view, a pawl-carrier 34 is journalled on the sleeve 8″ to which the cranking ratchet 9‴ is fixed. The pawl 16″ is pivoted to the pawl-carrier 34 by a pivot pin 35 and engages the cam 12″ and the cranking ratchet 9‴. The crank catch or seat 36, constructed to be engaged by the ordinary crank not shown is fixed to the pawl-carrier 34 in some suitable way; being shown as screwed thereinto at 37. The click 19 is pivoted by the stud 20′ to the frame 7′. When the crank, not shown, is connected to the catch 36 and is turned, the carrier 34 operates the pawl 16″ the same as before, and in case of back kick of the engine, the cam 12″ lifts the pawl as before from engagement with the cranking ratchet, thus allowing the engine shaft to spin.

In Fig. 10 the pawl 16″ is yieldingly held toward the cam and ratchet by the extension spring 27′.

By means of the construction and arrangement shown in Figs. 9 and 10, the appliance is adapted to be installed at any desired place.

I claim:

1. A safety motor crank comprising a cranking shaft journaled to revolve and adapted to crank the motor; a toothed wheel journaled on the cranking shaft and provided with a ratchet section and a pawl retracting section the teeth of which sections point in the same direction; a click engaging the ratchet section to prevent it from turning backward; a cranking ratchet wheel non-rotatable on the cranking shaft; a crank journaled on the cranking shaft; and a pawl pivoted to the crank and adapted to engage the cranking ratchet wheel to turn the cranking shaft; and to be retracted by the pawl retracting section on reverse movement of the shaft.

2. The combination with a shaft, of an attaching member to which a section of said shaft is journaled; a pawl releasing ratchet wheel in journaled relation to the attaching member and the shaft and provided with two peripheral faces, one of which is notched for engagement with a click and the second of which has arcs to actuate and support, and recesses to accommodate a pawl lifting arm; a click on said attaching member to engage the notches; a ratchet wheel fixed to the shaft to rotate the same and to rotate therewith; a crank journaled on the shaft; and a pawl pivoted to the crank and adapted to enter the recesses and to be operated by the arcs of the pawl releasing ratchet wheel, to release the cranking ratchet wheel.

3. The combination with a shaft of an attaching member to which a section of said shaft is journaled; a pawl releasing ratchet wheel in journaled relation to the attaching member and the shaft and provided with two peripheral faces, one of which is notched for engagement with a click and the second of which has arcs to actuate and support, and recesses to accommodate a pawl lifting arm; a click on said attaching member to engage the notches; a cranking ratchet wheel fixed to the shaft to rotate the same and to rotate therewith; a crank journaled on the shaft; a pawl pivoted to the crank and engaging the cranking ratchet wheel and having a tip to enter the recesses and to be operated by the arcs of the pawl for alternately holding and releasing the ratchet wheel.

4. The combination with a shaft, of an attaching member to which a section of said shaft is journaled; pawl releasing means in journaled relation to the attaching member and the shaft and provided with two peripheral faces, one of which is notched for engagement with means that allow it to rotate in one direction only, the second of which has arcs to actuate and support, and recesses to accommodate, a pawl lifting limb; a click on said attaching member to engage the notches; a cranking ratchet wheel fixed to the shaft to rotate the same and to rotate therewith; a crank journaled on the shaft; a pawl pivoted to the crank and engaging the cranking ratchet wheel and having an arm to enter the recesses and to be operated by the arcs of the pawl releasing ratchet wheel, according as the power is applied by or to the cranking shaft.

5. The combination with a motor shaft and a cranking shaft connected thereto; of a sleeve fixed to said cranking shaft; a pawl carrier journaled on said sleeve; a pawl on said carrier adapted to engage said sleeve to turn the cranking shaft; and means whereby said pawl is held out of engagement with said sleeve when the motor shaft revolves either forward or backward.

6. The combination with a motor cranking shaft; of cranking means fastened to the outer end of said shaft; said means comprising a pawl carrier journaled on said shaft; a ratchet wheel fixed on said shaft, a pawl on said carrier adapted to engage said ratchet wheel; a pawl releasing ratchet wheel journaled on said shaft and provided with two peripheral faces, one of which is notched for engagement with a click and the other of which has arcs to actuate and support, and recesses to accommodate, a portion of said pawl; and a click in fixed relation to said pawl releasing ratchet and adapted to engage said notched portion to prevent said releasing wheel from turning backward; said pawl being disengaged from said ratchet wheel and supported in such disengagement by said arcs when the motor shaft has reverse movement or increased forward movement.

In testimony whereof, I have hereunto set my hand at Greenwood, Arkansas, this 8th day of October, 1919.

PATRICK LOUIE SMITH.

Witness:
CHAS. E. OSBORN.